(12) United States Patent
Nguyen et al.

(10) Patent No.: US 11,447,690 B2
(45) Date of Patent: *Sep. 20, 2022

(54) ENHANCING PROPPED FRACTURE CONDUCTIVITY IN SUBTERRANEAN WELLS

(71) Applicant: Halliburton Energy Services, Inc., Houston, TX (US)

(72) Inventors: Philip D. Nguyen, Houston, TX (US); Loan K. Vo, Houston, TX (US); Matthew Lewis Lahman, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,566

(22) Filed: May 17, 2021

(65) Prior Publication Data

US 2021/0269705 A1 Sep. 2, 2021

Related U.S. Application Data

(62) Division of application No. 16/089,936, filed as application No. PCT/US2016/039084 on Jun. 23, 2016, now Pat. No. 11,041,111.

(51) Int. Cl.
*C09K 8/68* (2006.01)
*C09K 8/80* (2006.01)
(Continued)

(52) U.S. Cl.
CPC ............... *C09K 8/68* (2013.01); *C09K 8/40* (2013.01); *C09K 8/601* (2013.01); *C09K 8/66* (2013.01);
(Continued)

(58) Field of Classification Search
CPC . C09K 8/68; C09K 8/40; C09K 8/601; C09K 8/66; C09K 8/80; C09K 8/805;
(Continued)

(56) References Cited

U.S. PATENT DOCUMENTS 6,059,034 A    5/2000  Rickards et al.
7,044,220 B2   5/2006  Nguyen et al.
(Continued)

FOREIGN PATENT DOCUMENTS

WO      2016036363         3/2016
WO      WO-2016036363  A1 * 3/2016 ............... C09K 8/80

OTHER PUBLICATIONS

ISRWO International Search Report and Written Opinion for PCT/US2016/039084 dated Jun. 23, 2016.
(Continued)

*Primary Examiner* — Crystal J. Lee
(74) *Attorney, Agent, or Firm* — Thomas Rooney; C. Tumey Law Group PLLC (57) ABSTRACT

A variety of systems, methods and compositions are disclosed, including, in one method, a method may comprise providing a proppant-free fracturing fluid; providing a proppant composition, wherein the proppant composition comprises proppant particulates and degradable thermoplastic particulates; introducing the proppant-free fracturing fluid into a subterranean formation at an injection rate above a fracture gradient to create or enhance at least one fracture in the subterranean formation; introducing the proppant composition into the at least one fracture; and allowing the proppant composition to form a proppant pack in the fracture, wherein the degradable thermoplastic particulates are degradable to generate voids in the proppant pack.

18 Claims, 2 Drawing Sheets

(51) Int. Cl.
*E21B 43/267* (2006.01)
*C09K 8/66* (2006.01)
*C09K 8/40* (2006.01)
*C09K 8/60* (2006.01)
*E21B 21/00* (2006.01)

(52) U.S. Cl.
CPC ............... *C09K 8/80* (2013.01); *C09K 8/805* (2013.01); *E21B 21/003* (2013.01); *E21B 43/267* (2013.01); *C09K 2208/30* (2013.01)

(58) Field of Classification Search
CPC ... C09K 2208/30; E21B 21/003; E21B 43/26; E21B 43/267
See application file for complete search history.

(56) References Cited

U.S. PATENT DOCUMENTS

| | | | |
|---|---|---|---|
| 8,448,706 B2 | 5/2013 | Hughes et al. | |
| 8,496,056 B2 | 7/2013 | Hartman et al. | |
| 8,657,002 B2 | 2/2014 | Willberg et al. | |
| 8,757,259 B2 | 6/2014 | Lesko et al. | |
| 8,776,882 B2 | 7/2014 | Shindgikar et al. | |
| 8,887,803 B2 | 11/2014 | East, Jr. et al. | |
| 8,973,659 B2 | 3/2015 | Karadkar et al. | |
| 8,997,868 B2 | 4/2015 | Nguyen et al. | |
| 9,260,650 B2 | 12/2016 | Nguyen et al. | |
| 10,364,660 B2 * | 7/2019 | Nguyen | E21B 43/267 |
| 2005/0059558 A1 | 3/2005 | Blauch et al. | |
| 2006/0113078 A1 | 6/2006 | Nguyen et al. | |
| 2006/0151170 A1 | 7/2006 | Brannon et al. | |
| 2006/0258546 A1 | 11/2006 | Brannon et al. | |
| 2008/0135242 A1 | 6/2008 | Lesko et al. | |
| 2014/0020893 A1 | 1/2014 | Smith et al. | |
| 2014/0048262 A1 | 2/2014 | Worley et al. | |
| 2014/0060826 A1 * | 3/2014 | Nguyen | E21B 43/267 166/280.1 |
| 2014/0131041 A1 | 5/2014 | Liang et al. | |
| 2015/0167443 A1 | 6/2015 | Litvinets et al. | |
| 2015/0233226 A1 | 8/2015 | Holzhauser et al. | |
| 2017/0002623 A1 * | 1/2017 | Lecerf | E21B 33/138 |

OTHER PUBLICATIONS

Examination Report for Canadian Application No. 3,021,291 dated Oct. 11, 2019.
Non-Final Office Action Summary for U.S. Appl. No. 16/089,936 dated Apr. 22, 2020.
Final Office Action Summary for U.S. Appl. No. 16/089,936 dated Oct. 21, 2020.
Non-Final Office Action Summary for U.S. Appl. No. 16/089,936 dated Jan. 22, 2021.
Notice of Allowance for U.S. Appl. No. 16/089,936 dated Apr. 14, 2021.
IPTC, Nguyen, et al., Evaluation of Low-Quality Sand for Proppant-Free Channel Fracturing Method, IPTC-17937-MS. 2014.

* cited by examiner

ENHANCING PROPPED FRACTURE CONDUCTIVITY IN SUBTERRANEAN WELLS

BACKGROUND

Fracturing treatments are commonly used in subterranean operations, among other purposes, to stimulate the production of desired fluids (e.g., oil, gas, water, etc.) from a subterranean formation. For example, hydraulic fracturing treatments generally involve pumping a treatment fluid (e.g., a fracturing fluid) into a well bore that penetrates a subterranean formation at a sufficient hydraulic pressure to create or enhance one or more fractures in the subterranean formation. The creation and/or enhancement of these fractures may enhance the production of fluids from the subterranean formation.

In order to maintain and/or enhance the conductivity of a fracture in a subterranean formation, proppant particulates may be deposited in the fracture, for example, by introducing a fluid carrying those proppant particulates into the subterranean formation. The proppant particulates may prevent the fractures from fully closing upon the release of hydraulic pressure, forming conductive channels through which fluids may flow to the wellbore.

BRIEF DESCRIPTION OF THE DRAWINGS

These drawings illustrate certain aspects of the present disclosure, and should not be used to limit or define the disclosure.

DETAILED DESCRIPTION

The systems, methods, and/or compositions disclosed herein may relate to subterranean operations and, in some systems, methods, and compositions, to introduction of degradable thermoplastic particulates to improve the performance of hydraulic fracturing treatments. Among other things, the degradable thermoplastic particulates may be used for diversion of subsequent fluid injections. In addition, by degrading after their placement, the degradable thermoplastic particulates may be used to enhance propped fracture conductivity and, thus increase well productivity.

The degradable thermoplastic particulates may be non-toxic and may comprise an oil-soluble thermoplastic polymer. Any of a variety of thermoplastic polymers that are oil-soluble may be used. Non-limiting examples of suitable thermoplastic polymers may comprise polystyrene, styrene/methyl methacrylate copolymer, polypropylene, polymethyl methacrylate, polyphenylene oxide, polyethylene, ethylene/propylene copolymer, polypropylene carbonate, thylene/propylene/styrene interpolymer, and mixtures, blends, and alloys thereof.

Without limitation, the degradable thermoplastic particulates may be oil-soluble so they may degrade when exposed to liquid hydrocarbons after placement downhole. By way of example, the degradable thermoplastic particulates may undergo an irreversible degradation downhole, in that they may not recrystallized or reconstitute downhole. The terms "degradation" and "degradable" may refer to either or both of heterogeneous degradation (or bulk erosion) and/or homogenous degradation (or surface erosion), and/or to any stage of degradation in between these two. Without being limited by theory, the rate and extent of degradation may be impacted by a number of factors, including the particular solvent, temperature, and pH, among others.

The degradable thermoplastic particulates may be substantially spherical in shape and have an average diameter of from about 0.001 mm to about 10 mm. However, other shapes including oval, cubical, triangular, cylindrical, rod, fibrous, reticulated, may also be applied. In addition, particle sizes outside this range may also be suitable, depending on the particular application. Without limitation, the degradable thermoplastic particulates may have a uni-modal or multi-modal particle size distribution. For example, multi-modal particle size distributions may enable formation of packs, bridges, or filtercakes in diversion applications to thereby obstruct fluid flow. The degradable thermoplastic particulates with a multi-modal particle size distribution may be used as a diverting agent in the wellbore region to temporary seal perforations entrances of propped fractures, or other flow paths, such that one or more new primary fractures can be created. Additionally, the degradable thermoplastic particulates may include multi-modal particle size distributions to enable function as diverting agents in the near-wellbore region, such that the primary fractures or branches thereof may be temporarily sealed off to increase the net pressure, allowing generation of new fracture branches or a complex fracture network. Without limitation, an example multi-modal particle size distribution may have about 20-25% of the material by weight at a particle size of about 4 to about 10 mesh, U.S. Sieve Series; about 50% of the material may have a particle size in the range of about 20 to about 40 mesh size while the remaining material may have a particle size of less than about 40 mesh. Alternatively, where it is desired that an obstruction forms in the far-wellbore region, the degradable thermoplastic particulates may be selected so as to have a smaller particle size (e.g., smaller than about 100 mesh). The near-wellbore region delimitation is dependent upon the formation where the wellbore is located, and is based on the wellbore surrounding conditions. The far-wellbore region is different from the near-wellbore region in that it is subjected to an entirely different set of conditions and/or stimuli. In an embodiment, the near-wellbore and far-wellbore regions are based on the fracture length propagating away from the wellbore. For example, the near-wellbore region may refer to about the first 20% of the fracture length propagating away from the wellbore whereas the far-wellbore region may refer to a length that is greater than about 20% of the fracture length propagating away from the wellbore. Again, without wishing to be limited by theory, degradable thermoplastic particulates may be carried a greater distance into the formation (e.g., into an existing and/or extending fracture).

The degradable thermoplastic particulates may be carried into the wellbore by a carrier fluid. Without limitation, the degradable thermoplastic particulates may be present in the carrier fluid in a concentration of about 0.1 pounds per gallon to about 10 pound per gallon (ppg), about 0.2 ppg to about 0.6 ppg. These ranges encompass every number in between, for example, the concentration may range between about 0.5 ppg to about 4 ppg. One of ordinary skill in the art with the benefit of this disclosure should be able to select an appropriate amount of the degradable thermoplastic particulates to use for a particular application.

The carrier fluid may be any of a variety of suitable fluids for suspending the degradable thermoplastic particulates, including slickwater fluids, aqueous gels, foams, emulsions, and viscosified surfactant fluids. Without limitation, the carrier fluid may also be referred to herein as a fracturing fluid, a proppant-laden fracturing fluid, or a spacer fluid. In addition, to the degradable thermoplastic particulates, the carrier fluid may also be used to carry proppant particulates into a subterranean formation, either alone or in combination with the degradable thermoplastic particulates. Suitable slickwater fluids may generally be prepared by addition of small concentrations of polymers (referred to as "friction reducing polymers") to water to produce what is known in the art as "slickwater." Suitable aqueous gels may be generally comprised of an aqueous fluid and one or more gelling agents. An aqueous gel may be formed by the combination of an aqueous fluid and coated particulates where the partitioning agent comprises a gelling agent. Emulsions may be comprised of two or more immiscible liquids such as an aqueous gelled liquid and a liquefied, normally gaseous fluid, such as nitrogen. Treatment fluids suitable for use in accordance with this disclosure may be aqueous gels comprised of an aqueous fluid, a gelling agent for gelling the aqueous fluid and increasing its viscosity, and optionally, a cross-linking agent for cross-linking the gel and further increasing the viscosity of the fluid. The cross-linking agent may be provided as a component of the partitioning agent on the coated particulates and may be introduced into the aqueous gel by the combination of the coated particulates with an aqueous fluid. The increased viscosity of the gelled or gelled and cross-linked treatment fluid, among other things, may reduce fluid loss and may allow the fracturing fluid to transport significant quantities of suspended particulates. The treatment fluids also may include one or more of a variety of well-known additives such as breakers, stabilizers, fluid loss control additives, clay stabilizers, bactericides, and the like.

Without limitation, the carrier fluid may comprise an aqueous-base fluid, which may be fresh water, saltwater (e.g., water containing one or more salts dissolved therein), brine (e.g., saturated saltwater), or seawater. Generally, the aqueous-base fluid may be from any source provided that it does not contain an excess of compounds that may adversely affect other components in the spacer fluid. Generally, the aqueous-base fluid may be present in the carrier fluids in an amount in the range of from about 45% to about 99.98% by volume of the carrier fluid. For example, the aqueous-base fluid may be present in the carrier fluids in an amount in the range of from about 65% to about 75% by volume of the carrier fluid.

The carrier fluid may comprise any number of additional additives, including, but not limited to, salts, surfactants, acids, fluid loss control additives, gas, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, gelling agents, breakers, weighting agents, particulate materials (e.g., proppant particulates) and any combination thereof. With the benefit of this disclosure, one of ordinary skill in the art should be able to recognize and select suitable additives for use in the carrier fluid.

Without limitation, the carrier fluid may comprise a friction reducing polymer. The friction reducing polymer may be included in the carrier fluid to form a slickwater fluid, for example. The friction reducing polymer may be a synthetic polymer. Additionally, for example, the friction reducing polymer may be an anionic polymer or a cationic polymer. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof. Without limitation, the friction reducing polymer may be included in the carrier fluid to provide a desired amount of friction reducing. For example, the friction reducing polymer may be included in the carrier fluid, for example, in an amount equal to or less than 0.2% by weight of the aqueous base fluid present in the carrier fluid. Without limitation, the friction reducing polymer may be included in the solids containing fluid in an amount sufficient to reduce friction without gel formation upon mixing. By way of example, the carrier fluid comprising the friction reducing polymer may not exhibit an apparent yield point.

The degradable thermoplastic particulates may be utilized in a proppant composition, which may be disposed in the carrier fluid. A concentration of degradable thermoplastic particulates in a proppant composition may be about 0.1% to about 20% w/w of proppant, preferably about 1% to about 10%. In addition to the degradable thermoplastic particulates, the proppant composition may include a variety of proppant particulates, including, but not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Without limitation, the proppant particulates may comprise graded sand. Other suitable proppant particulates that may be suitable for use in subterranean applications may also be useful. Without limitation, the proppant particulates may have a particle size in a range from about 2 mesh to about 400 mesh, U.S. Sieve Series. By way of example, the proppant particulates may have a particle size of about 10 mesh to about 70 mesh with distribution ranges of 10-20 mesh, 20-40 mesh, 40-60 mesh, or 50-70 mesh, depending, for example, on the particle sizes of the formation particulates to be screen out. The proppant composition may be carried by the carrier fluid. Without limitation, the proppant composition may be present in the carrier fluid in a concentration of about 0.1 pounds per gallon to about 10 ppg, about 0.2 ppg to about 6 ppg. These ranges encompass every number in between, for example. For example, the concentration may range between about 0.5 ppg to about 4 ppg. One of ordinary skill in the art with the benefit of this disclosure should be able to select an appropriate amount of the proppant composition to use for a particular application.

The proppant composition may further comprise a curable resin, a tackifying agent, or both. Inclusion of the resin in the proppant composition may fill the fractures, providing an in-situ mechanical screen that can hold the proppant composition in place while maintaining integrity of the well. Curable resins suitable for use in the proppant composition may include any resin that is capable of forming a hardened, consolidated mass. Many such curable resins are commonly used in consolidation treatments, and some suitable resins may include, without limitation, two component epoxy based resins, novolak resins, polyepoxide resins, phenolaldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable curable resins, such as epoxy resins, may be cured with an internal catalyst or activator so that when pumped downhole, they may be cured using only time and temperature. Other suitable curable resins, such as furan resins may generally require a time-delayed catalyst or an external catalyst to help activate the polymerization of the resins if the cure temperature is low (i.e., less than 250° F.) but may cure under the effect of time and temperature if the formation temperature is above about 250° F., preferably above about 300° F.

Selection of a suitable curable resin may be affected by the temperature of the subterranean formation to which the proppant composition may be introduced. By way of example, for a subterranean formation having a bottom hole static temperature ("BHST") ranging from about 60° F. to about 250° F., two component epoxy based resins comprising a hardenable resin component and a hardening agent component may be preferred. For a subterranean formation having a BHST ranging from about 300° F. to about 600° F., a furan based resin may be preferred, for example. For a subterranean formation having a BHST ranging from about 200° F. to about 400° F., either a phenolic based resin or a one component HT epoxy based resin may be suitable, for example. For a subterranean formation having a BHST of at least about 175° F., a phenol/phenol formaldehyde/furfuryl alcohol resin may also be suitable, for example. With the benefit of this disclosure, one of ordinary skill in the art should be able to recognize and select a suitable resin for use in consolidation treatment applications.

In some examples, a solvent may be used with the curable resin. Any solvent that is compatible with the degradable thermoplastic particulates and achieves the desired viscosity effect may be suitable for use. Suitable solvents are those having high flash points (e.g., about 125° F.); such solvents may include, but are not limited to, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, or combinations thereof. Other solvents may include aqueous dissolvable solvents such as, methanol, isopropanol, butanol, glycol ether solvents, and combinations thereof. Suitable glycol ether solvents may also be used, examples may include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent may be dependent on the curable resin chosen.

As mentioned above, the proppant composition may comprise a tackifying agent. Tackifying agents may be utilized in hydraulic fracturing, wherein a formation may be treated to increase its permeability by hydraulically fracturing the formation to create or enhance one or more fractures. In many cases, hydraulic fracturing may involve pumping a particulate-free, viscous fluid (known as a pad fluid) into a subterranean formation faster than the fluid can escape into the formation so that the pressure applied to the formation increases, and the formation breaks, creating an artificial fracture or enlarging a natural fracture. Then a proppant particulate may be added to a fluid to form a slurry that is pumped into the fracture to prevent the fracture from closing when the pumping pressure is released. Often, the proppant particulate may be coated with a tackifying agent to enhance agglomeration and to prevent migration of the proppant particulates after they are placed in the fracture.

Compositions suitable for use as tackifying agents in the present disclosure may comprise any compound that, when in liquid form or in a solvent solution, will form a tacky, non-hardening coating upon a particulate. Tackifying agents suitable for use in the present disclosure include non-aqueous tackifying agents; aqueous tackifying agents; silyl-modified polyamides, and reaction products of an amine and a phosphate ester. In addition to encouraging particulates to form aggregates, the use of a tackifying agent may reduce particulate flow back once the particulates are placed into a subterranean formation. The tackifying agents are may be coated used in an amount ranging from about 0.1% to about 5% by weight of the proppant composition, for example, ranging from about 0.5% to about 2.5% by weight of the proppant composition. One type of tackifying agent suitable may be a non-aqueous tackifying agent. A specific example of a suitable tackifying agents may comprise polyamides that are liquids or in solution at the temperature of the subterranean formation such that they are, by themselves, non-hardening when introduced into the subterranean formation. An example of a tacking agent may comprise a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like.

Non-aqueous tackifying agents suitable for use in the present disclosure may be either used such that they form non-hardening coating or they may be combined with a multifunctional material capable of reacting with the non-aqueous tackifying agent to form a hardened coating. A "hardened coating" as used herein means that the reaction of the tackifying agent with the multifunctional material will result in a substantially non-flowable reaction product that exhibits a higher compressive strength in a consolidated agglomerate than the tackifying agent alone with the particulates. In this instance, the non-aqueous tackifying agent may function similarly to a curable resin. Multifunctional materials suitable for use may include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. Without limitation, the multifunctional material may be mixed with the tackifying agent in an amount of from about 0.01 to about 50 percent by weight of the tackifying agent to effect formation of the reaction product. Specifically, the multifunctional material is present in an amount of from about 0.5 to about 1 percent by weight of the tackifying agent.

Aqueous tackifying agents suitable for use in the present disclosure may not be significantly tacky when placed onto a particulate, but may be capable of being "activated" (that is destabilized, coalesced and/or reacted) to transform the compound into a sticky, tackifying compound at a desirable time. Such activation may occur before, during, or after the aqueous tackifying agent is placed in the subterranean formation. In some embodiments, a pretreatment may be first contacted with the surface of a particulate to prepare it to be coated with an aqueous tackifying agent. Suitable aqueous tackifying agents may be generally charged polymers that comprise compounds that, when in an aqueous solvent or solution, may form a non-hardening coating (by itself or with an activator) and, when placed on a particulate, may increase the continuous critical resuspension velocity of the particulate when contacted by a stream of water. The aqueous tackifying agent may enhance the grain-to-grain contact between the individual particulates within the formation (be they proppant particulates, formation fines, or other particulates), helping bring about the consolidation of the particulates into a cohesive, flexible, and permeable mass. Suitable aqueous tackifying agents include any polymer that can bind, coagulate, or flocculate a particulate. Also, polymers that function as pressure sensitive adhesives may be suitable. Examples of aqueous tackifying agents suitable for use in the present invention include, but are not limited to: acrylic acid polymers; acrylic acid ester polymers; acrylic acid derivative polymers; acrylic acid homopolymers; acrylic acid ester homopolymers (such as poly (methyl acrylate), poly (butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers, derivatives thereof, and combinations thereof.

The degradable thermoplastic particulates may be utilized in a temporary diverting composition, which may be disposed in the carrier fluid. In addition to the degradable thermoplastic particulates, the temporary diverting composition may comprise one or more non-degradable particulates, such as such as natural sand, fly ash, or silica flour. Other suitable particulates that may be suitable for use in subterranean applications as diverting agents may also be useful. The temporary diverting composition may be carried by the carrier fluid. Without limitation, the temporary diverting composition may be present in the carrier fluid in a concentration of about 0.1 ppg to about 10 ppg, about 0.2 ppg to about 6 ppg. These ranges encompass every number in between, for example. For example, the concentration may range between about 0.5 ppg to about 4 ppg. One of ordinary skill in the art with the benefit of this disclosure should be able to select an appropriate amount of the temporary diverting composition to use for a particular application.

As previously described, the degradable thermoplastic particulates may be used in fracturing treatments, among other things, as a diverting agent or a degradable solid particulate placed into the fracture. A method of fracturing a wellbore may comprise placing a fracturing fluid into a portion of a wellbore. The fracturing fluid may be used to create or extend one or more fractures in the subterranean formation. The fracturing fluid may enter flow paths to create one or more primary fractures extending from the wellbore into the subterranean formation. Branches extend from the primary fractures. A fracturing fluid, commonly referred to as a pre-pad or pad fluid, may be injected to initiate the fracturing of a subterranean formation prior to the injection of proppant particulate. The pre-pad or pad fluid may be proppant-free or substantially, proppant-free. The proppant particulates may be suspended in a fracturing fluid which may be injected into the subterranean formation to create and/or extend at least one fracture. In order to create and/or extend a fracture, a fluid is typically injected into the subterranean formation at a rate sufficient to generate a pressure above the fracture gradient.

In diversion applications, the diverting agent may be placed into a flow path (e.g., a subterranean flow path within a wellbore and/or surrounding formation), for example, so as to form a diverter plug (e.g., pack, bridge, filtercake, or plug) and thereby obstruct fluid movement via the flow path. By way of example, the degradable thermoplastic particulates, either alone, or in a temporary diverting composition, may form a diverter plug in the flow path such that the fracturing fluid may be diverted within the wellbore and/or surrounding formation during fracturing treatment. The diverter plug formed by the diverting agent may result in an increased net pressure in the near wellbore region, ranging, for example, from 50 psi to 5000 psi.

To form additional primary fractures extending from the wellbore, the temporary diverting composition may be used to temporarily obstruct flow into the primary fractures in the near wellbore region. Without limitation, the temporary diverting agents may be used to form a diverter plug in the near wellbore region (e.g., perforations, fracture entrance, etc.) to prevent flow into the primary fracture so that additional intervals of the wellbore may be fractured. For example, the obstructions in the near wellbore region may divert a fracturing fluid into the subterranean formation via another flow path so that one or more additional primary fractures may be created. To form branches from the primary fracture or a complex fracture network, the temporary diverting agents may be used to form a diverter plug in the primary fracture (or branches therefrom) so that a fracturing fluid may be diverted to additional flow paths in the subterranean formation creating branches from the primary fracture (or branches therefrom). Within a fracturing operation, the process of introducing a fracturing fluid into the formation and, thereafter, diverting the fracturing fluid to another flow path into the formation and/or to a different location or depth within a given flow path may be continued until some user and/or process goal is obtained. In an additional embodiment, this diverting procedure may be repeated with respect to each of a second, third, fourth, fifth, sixth, or more, treatment stages.

In diversion applications, the degradable thermoplastic particulates may be placed into the wellbore by pumping a slug of a carrier fluid (e.g., a fluid having a different composition than the fracturing fluid) comprising the degradable thermoplastic particulates or by adding the degradable thermoplastic particulates directly to the fracturing fluid, such that the fracturing fluid is the carrier fluid, for example, to create a slug of fracturing fluid comprising the degradable thermoplastic particulates. As previously described, the degradable thermoplastic particulates may form a diverter plug at the first location (and any subsequent location so treated) such that the fracturing fluid may be selectively placed at one or more additional locations, for example during a multi-stage fracturing operation.

In addition to diverting agents, the degradable thermoplastic particulates may be also be placed into fractures as degradable sold particulates, to thereby, provide fractures with enhanced conductivity upon their removal. As previously described, a fracturing fluid (e.g., a pad or pre-pad fluid that is proppant free) may be used to initiate the fracturing of a subterranean formation, for example, by introduction of the fracturing fluid at an injection rate above the fracture gradient to create or enhance at least one fracture in the subterranean formation. Without limitation, a proppant composition comprising proppant particulates and the degradable thermoplastic particulates may then be deposited in one or more fractures in the subterranean formation to form a proppant pack. A fracturing fluid, such as the previously described carrier fluids, may be used to deposit the proppant composition in the one or more fractures. Upon their degradation, the degradable thermoplastic particulates may leave voids in the proppant pack, thereby forming a more permeable fracture.

Alternatively, the degradable thermoplastic particulates may be used as degradable solid particulates to form proppant free channels in the fracture that are more spacious than the interstitial spaces within proppant packs. As previously described, a fracturing fluid (e.g., a pad or pre-pad fluid that is proppant free) may be used to initiate the fracturing of a subterranean formation, for example, by introduction of the fracturing fluid at an injection rate above the fracture gradient to create or enhance at least one fracture in the subterranean formation. The proppant free channels may be produced by intermittently introducing a fracturing fluid comprising proppant particulates and a carrier fluid comprising degradable thermoplastic particulates. The proppant particulates in the one or more fractures, surrounded and neutrally suspended by the spacer fluid. In this intermittent injection technique, the carrier fluid may be a spacer fluid. The spacer fluid may be an aqueous gel. The proppant particulates may be coated with a binding agent, such as a tackifying agent or a curable resin. The fracture may be allowed to close on the proppant particulates and the degradable thermoplastic particulates. Degradation of the degradable thermoplastic particulates may leave behind proppant free channels in the fracture. Produced fluids may degrade the degradable thermoplastic particulates and may also remove the spacer fluid from the one or more fractures.

Following the fracturing operation, the wellbore and/or the subterranean formation may be prepared for production, for example, production of a hydrocarbon, therefrom. Preparing the wellbore and/or formation for production may comprise removing the degradable thermoplastic particulates (e.g., from the proppant pack, from the temporary plug, etc.) from one or more flow paths, for example, by allowing the degradable thermoplastic particulates therein to degrade and subsequently recovering hydrocarbons from the formation via the wellbore. As previously described, the degradable thermoplastic hydrocarbons may be oil-soluble such that they may degrade when contacted with oleaginous fluids. The degradable thermoplastic particulates may be degraded by produced fluids. The degradable particles may also be degraded by materials purposely placed in the formation by injection, mixing the degradable particle with delayed reaction degradation agents, or other suitable means to induce degradation.

A method may comprise providing a proppant-free fracturing fluid; providing a proppant composition, wherein the proppant composition comprises proppant particulates and degradable thermoplastic particulates; introducing the proppant-free fracturing fluid into a subterranean formation at an injection rate above a fracture gradient to create or enhance at least one fracture in the subterranean formation; introducing the proppant composition into the at least one fracture; and allowing the proppant composition to form a proppant pack in the fracture, wherein the degradable thermoplastic particulates are degradable to generate voids in the proppant pack. This method may comprise any of the following features in any combination. The proppant composition may comprise at least one binding agent selected from the group consisting of a curable resin, a tackifying agent, or a combination thereof. The curable resin may comprise at least one resin selected from the group consisting of an epoxy resin, a two component epoxy based resins, novolak resins, polyepoxide resins, phenol-aldehyde resins, urea-aldehyde resins, urethane resins, phenolic resins, furan resins, furan alcohol resins, furfuryl alcohol resins, phenolic/latex resins, phenol formaldehyde resins, polyester resins and hybrids and copolymers thereof, polyurethane resins and hybrids and copolymers thereof, acrylate resins, and combinations thereof. The proppant composition may be introduced into the at least one fracture in a carrier fluid selected from the group consisting of aqueous fluids, non-aqueous fluids, slickwater fluids, aqueous gels, viscoelastic surfactant gels, foamed gels, emulsions, and combinations thereof. A method may further comprising isolating with a plug an interval of interest before the injecting the proppant free fracturing fluid. The degradable thermoplastic particulates may comprise at least one oil-soluble thermoplastic polymer selected from the group consisting of polystyrene, styrene methacrylate copolymer, methyl methacrylate copolymer, polypropylene, polymethyl methacrylate, polyphenylene oxide, polyethylene, ethylene copolymer, propylene copolymer, polypropylene carbonate, ethylene interpolymer, propylene interpolymer, styrene interpolymer, and combinations thereof. The degradable thermoplastic particulates may have an average diameter from about 0.001 mm to about 10 mm. A method may further comprise introducing additional degradable thermoplastic particulates to form a diverting plug in at least one flow path to divert subsequently introduced fluids to another flow path, wherein the degradable thermoplastic particulates in the diverting plug are multi-modal in particle size. The diverting plug may be formed in a perforation or a number of perforations such that the subsequently introduced fluids forms one or more new primary fractures in the subterranean formation. A method may further comprise allowing the degradable thermoplastic particulates to degrade with produced fluids. A concentration of the degradable thermoplastic particulates in the proppant composition may be about 1% to about 10% by weight of the proppant composition.

A method may comprise providing a proppant-free fracturing fluid, wherein the proppant-free fracturing fluid comprises an aqueous base fluid; providing a proppant-laden fracturing fluid comprising an aqueous base fluid and proppant particulates coated with a binding agent; providing a spacer fluid, wherein the spacer fluid comprises an aqueous base fluid and degradable thermoplastic particulates; introducing the proppant-free fracturing fluid into a subterranean formation at an injection rate above a fracture gradient to create at least one fracture in the subterranean formation; and introducing the proppant-laden fracturing fluid and the spacer fluid intermittently into the at least one fracture such that the proppant particulates aggregate in the at least one fracture and are surrounded and neutrally suspended by the spacer fluid, wherein the degradable thermoplastic particulates are degradable to create proppant-free channels in the at least one fracture. This method may comprise any of the following features in any combination. A method may further comprise introducing additional degradable thermoplastic particulates to form a diverting plug in at least one flow path to divert subsequently introduced fluids to another flow path, wherein the degradable thermoplastic particulates in the diverting plug are multi-modal in particle size. The spacer fluid may be a carrier fluid selected from the group consisting of aqueous gels, viscoelastic surfactant gels, foamed gels, emulsions, and combinations thereof. The degradable thermoplastic particulates may comprise at least one oil-soluble thermoplastic polymer selected from the group consisting of polystyrene, styrene methacrylate copolymer, methyl methacrylate copolymer, polypropylene, polymethyl methacrylate, polyphenylene oxide, polyethylene, ethylene copolymer, propylene copolymer, polypropylene carbonate, ethylene interpolymer, propylene interpolymer, styrene interpolymer, and combinations thereof. The degradable thermoplastic particulates may have an average diameter from about 0.001 mm to about 10 mm. A method may further comprise allowing the degradable thermoplastic particulates to degrade with produced fluids to form proppant free channels in the at least one fracture, and wherein the produced fluids carry the spacer fluid from the at least one fracture.

A system may comprise a proppant-free fracturing fluid, wherein the proppant-free fracturing fluid comprises an aqueous base fluid; a proppant-laden fracturing fluid, wherein the proppant-laden fracturing fluid comprises an aqueous base fluid and proppant particulates; degradable thermoplastic particulates; and pumping equipment capable of pumping the proppant-free fracturing fluid, the proppant-laden fracturing fluid, and/or the degradable thermoplastic particulates down a wellbore at a rate to fracture a subterranean formation. This system may comprise any of the following features in any combination. The degradable thermoplastic particulates may be disposed in the proppant-laden fracturing fluid or in a spacer fluid. The degradable thermoplastic particulates may have an average diameter from about 0.001 mm to about 10 mm, wherein the degradable thermoplastic particulates comprise at least one oil-soluble thermoplastic polymer selected from the group consisting of polystyrene, styrene methacrylate copolymer, methyl methacrylate copolymer, polypropylene, polymethyl methacrylate, polyphenylene oxide, polyethylene, ethylene copolymer, propylene copolymer, polypropylene carbonate, ethylene interpolymer, propylene interpolymer, styrene interpolymer, and combinations thereof.

Figure 1:
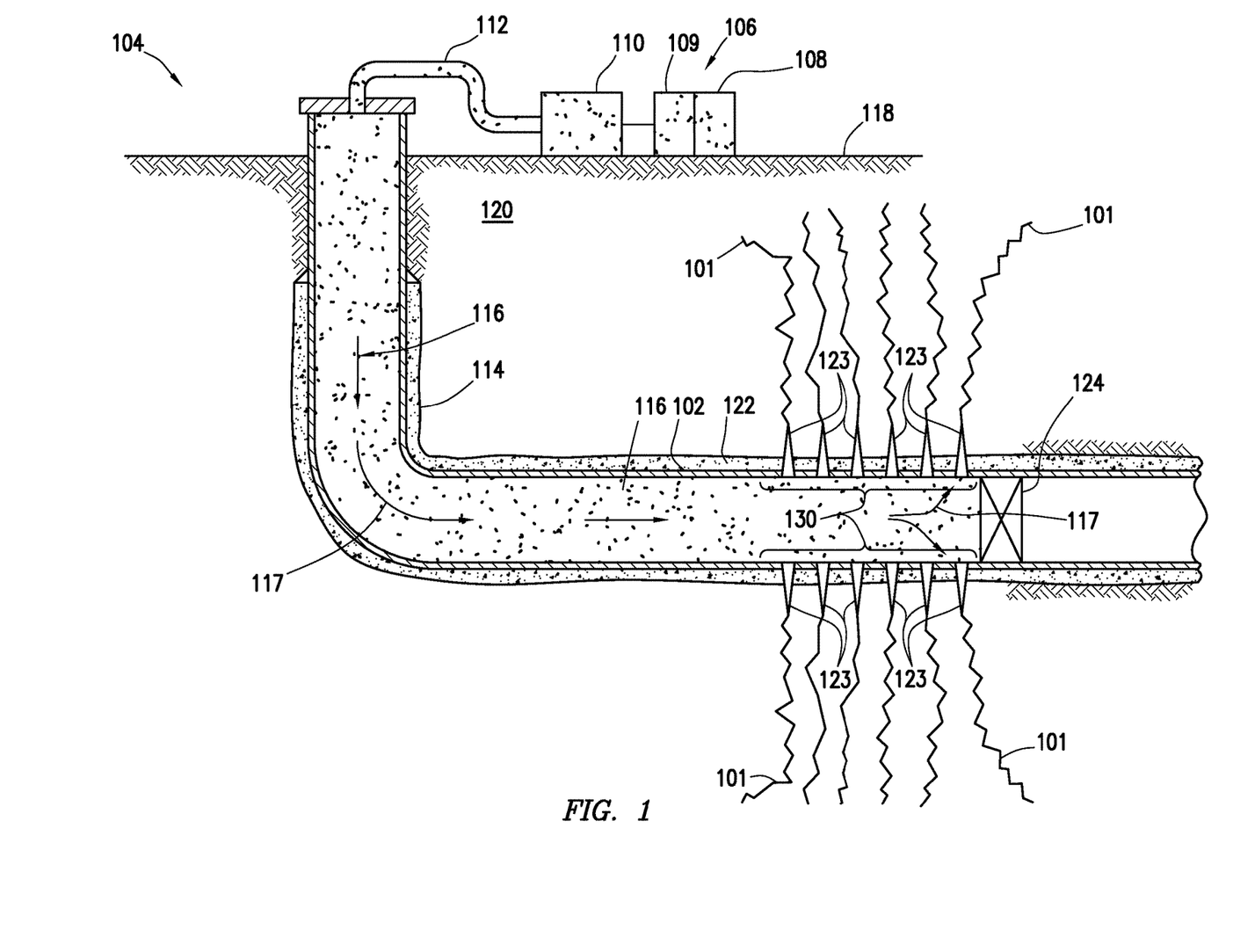
FIG. 1 is a schematic view of an example well system utilized for hydraulic fracturing.

FIG. 1 illustrates an example well system 104 that may be used to introduce degradable thermoplastic particulate 116 into fractures 100. The well system 104 may include a fluid handling system 106, which may include fluid supply 108, mixing equipment 109, pumping equipment 110, and wellbore supply conduit 112. Pumping equipment 110 may be fluidly coupled with the fluid supply 108 and wellbore supply conduit 112 to communicate a carrier fluid 117, which may comprise proppant particulates and/or degradable thermoplastic particulates 116 into wellbore 114. The fluid supply 108 and pumping equipment 110 may be above the surface 118 while the wellbore 114 is below the surface 118. The carrier fluid 117 may include proppant particulates coated with a binding agent, such as a curable resin or a tackifying agent.

The well system 104 may also be used for the injection of proppant-free fracturing fluid (e.g., a pad or pre-pad fluid) into the subterranean formation at an injection rate above the fracture gradient to create at least one fracture 101 in subterranean formation 120. The well system 104 may then inject the carrier fluid 117 into subterranean formation 120 surrounding the wellbore 114. Generally, a wellbore 114 may include horizontal, vertical, slanted, curved, and other types of wellbore geometries and orientations, and the proppant and degradable thermoplastic particulates 116 may generally be applied to subterranean formation 120 surrounding any portion of wellbore 114, including fractures 101. The wellbore 114 may include the casing 102 that may be cemented (or otherwise secured) to the wall wellbore 114 by cement sheath 122. Perforations 123 may allow communication between the wellbore 114 and the subterranean formation 120. As illustrated, perforations 123 may penetrate casing 102 and cement sheath 122 allowing communication between interior of casing 102 and fractures 101. A plug 124, which may be any type of plug for oilfield applications (e.g., bridge plug), may be disposed in wellbore 114 below the perforations 123.

In accordance with systems, methods, and/or compositions of the present disclosure, a perforated interval of interest 130 (depth interval of wellbore 114 including perforations 123) may be isolated with plug 124. A proppant-free fracturing fluid may be injected into the subterranean formation 120 at an injection rate above the fracture gradient to create at least one fracture 101 in subterranean formation 120. Then, degradable thermoplastic particulates 116 may be mixed with an aqueous base fluid and optionally proppant particulates via mixing equipment 109, thereby forming a carrier fluid 117, and then may be pumped via pumping equipment 110 from fluid supply 108 down the interior of casing 102 and into subsurface formation 120 at or above a fracture gradient of the subterranean formation 120. Pumping the carrier fluid 117 at or above the fracture gradient of the subsurface formation 120 may create (or enhance) at least one fracture (e.g., fractures 101) extending from the perforations 123 into the subsurface formation 120. Alternatively, the carrier fluid 117 may be pumped down production tubing, coiled tubing, or a combination of coiled tubing and annulus between the coiled tubing and the casing 102.

Figure 2:
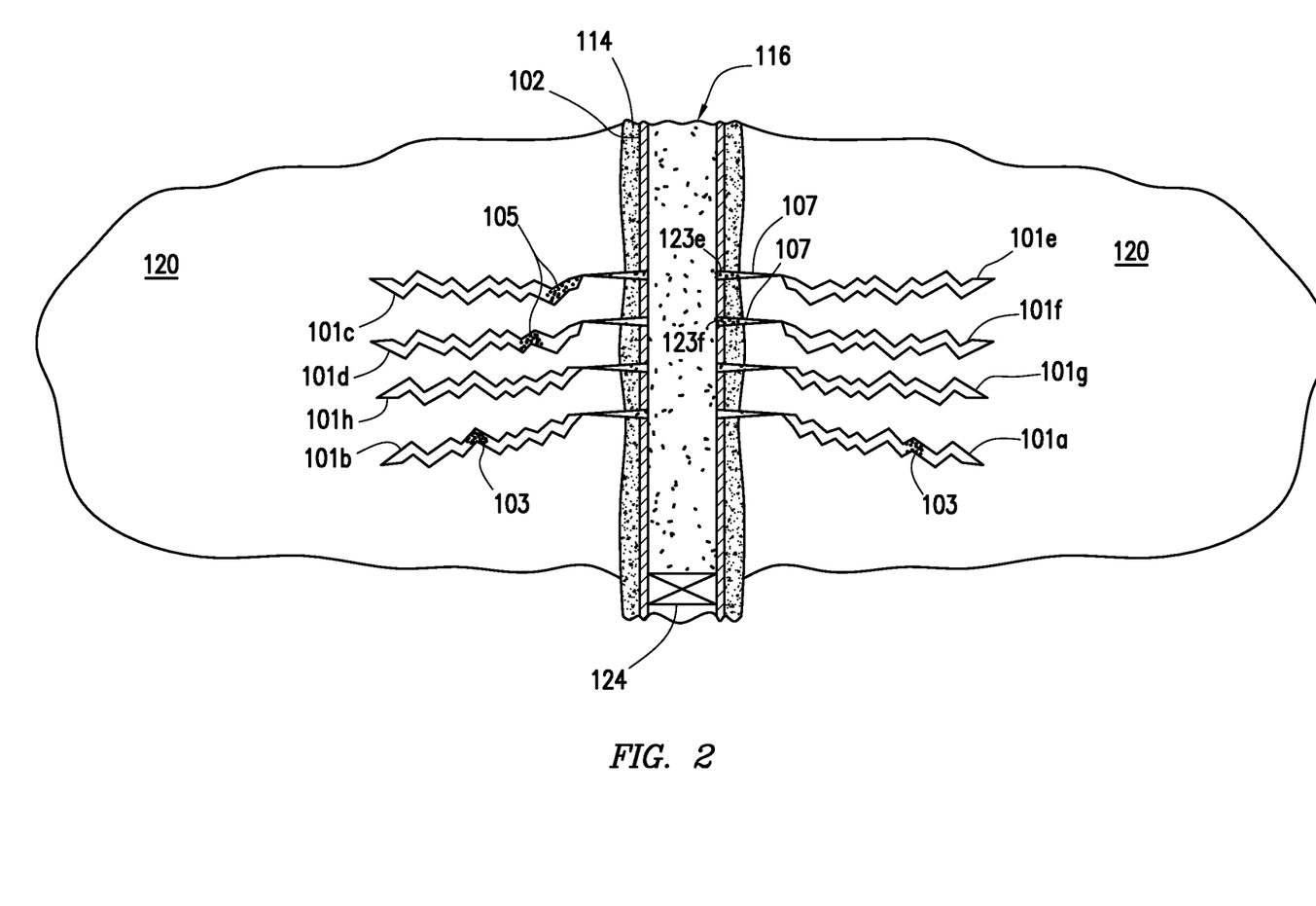
FIG. 2 is a schematic view of an example of a wellbore after introduction of degradable thermoplastic particulates.

At least a portion of the carrier fluid 117 may enter the fractures 101 of subterranean formation 120 surrounding wellbore 114 by way of perforations 123. Perforations 123 may extend from the interior of casing 102, through cement sheath 122, and into formation 120. Referring to FIG. 2, the wellbore 114 is shown after placement of the degradable thermoplastic particulates 116 in accordance with systems, methods, and compositions of the present disclosure. While, various uses the degradable thermoplastic particulates 116 are shown on FIG. 2, it should be understood that these different uses are not necessarily performed in conjunction. They are merely shown on FIG. 2 for illustrative purposes. First, the degradable thermoplastic particulates 116 may be used in forming more conductive fractures 101a, 101b. As illustrated, the degradable thermoplastic particulates 116 may be disposed in the fractures 101a, 101b. By way of example, the degradable thermoplastic particulates 116 may be disposed in proppant pack 103 with proppant particulates. As previously described, degradation of the degradable of the degradable thermoplastic particulates 116 may generate voids in the proppant pack 103 forming fractures 101a, 101b that are more permeable. As illustrated, the degradable thermoplastic particulates 116 may also be used as diverting agents, for example, forming a diverter plug, in the form of fracture bridge 105, in the fractures 101c, 101d. The degradable thermoplastic particulates 116 may also be used to form a diverter plug, in the form of perforation bridge 107, in the perforations 123 (e.g., 123e, 123f). The degradable thermoplastic particulates 116 may pack off (seal) perforations 123e, 123f at the entrance to fractures 101e, 101f, thereby, diverting subsequent fluid injections to other parts of the formation 120. The diverter plug, such as fracture bridge 105 and perforation bridge 107, may be temporary as the degradable thermoplastic particulates 116 may be degraded for removal. As further illustrated, the degradable thermoplastic particulates 116 and proppant particulates may also be intermittently injected into fractures 101g, 101h. The degradable particulates may be injected in a carrier fluid 117 in the form of spacer fluid such that the proppant particulates may aggregate in fractures 101g, 101h, surrounded and neutrally suspended by the spacer fluid.

The pumping equipment 110 may include a high pressure pump. As used herein, the term "high pressure pump" refers to a pump that is capable of delivering the carrier fluid 117 downhole at a pressure of about 1000 psi or greater. A high pressure pump may be used when it is desired to introduce the carrier fluid 117 into subterranean formation 120 at or above a fracture gradient of the subterranean formation 120, but it may also be used in cases where fracturing is not desired. Additionally, the high pressure pump may be capable of fluidly conveying particulate matter, such as the degradable thermoplastic particulates 116, into the subterranean formation 120. Suitable high pressure pumps may include, but are not limited to, floating piston pumps and positive displacement pumps. Without limitation, the initial pumping rates of the proppant free fracturing fluid may range from about 15 bbl/min to about 80 bbl/min, enough to effectively create a fracture into the formation.

Alternatively, the pumping equipment 110 may include a low pressure pump. As used herein, the term "low pressure pump" refers to a pump that operates at a pressure of about 1000 psi or less. A low pressure pump may be fluidly coupled to a high pressure pump that may be fluidly coupled to a tubular (e.g., wellbore supply conduit 112). The low pressure pump may be configured to convey the carrier fluid 117 to the high pressure pump. The low pressure pump may "step up" the pressure of the carrier fluid 117 before it reaches the high pressure pump.

Mixing equipment 109 may include a mixing tank that is upstream of the pumping equipment 110 and in which the carrier fluid 117 may be formulated. The pumping equipment 110 (e.g., a low pressure pump, a high pressure pump, or a combination thereof) may convey carrier fluid 117 from the mixing equipment 109 or other source of the carrier fluid 117 to the casing 102. Alternatively, the carrier fluid 117 may be formulated offsite and transported to a worksite, in which case the carrier fluid 117 may be introduced to the casing 102 via the pumping equipment 110 directly from its shipping container (e.g., a truck, a railcar, a barge, or the like) or from a transport pipeline. In either case, the carrier fluid 117 may be drawn into the pumping equipment 110, elevated to an appropriate pressure, and then introduced into the casing 102 for delivery downhole.

At least a portion of the subterranean formation 120 may have a permeability ranging from a lower limit of about 0.1 nano Darcy (nD), 1 nD, 10 nD, 25 nD, 50 nD, 100 nD, or 500 nD to an upper limit of about 10 mD, 1 mD, 500 microD, 100 microD, 10 microD, or 500 nD, and wherein the permeability may range from any lower limit to any upper limit and encompass any subset therebetween. Without limitation, the subterranean formation 120 may be considered an ultra-tight formation, for example, having a permeability of about 1 mD or less, which may be a shale formation, sandstone formation, or other type of rock formation.

To facilitate a better understanding of the present disclosure, the following examples of certain aspects of some of the systems and methods are given. In no way should the following examples be read to limit, or define, the entire scope of the disclosure.

EXAMPLES

Proppant particulates coated with a curable resin may be allowed to cure so that a proppant pack may be consolidated in place, preventing the movement of proppant grains or collapse of created voids/channels during well production. Previous experimental work has shown that an inclusion of 5% w/w of degradable particulates, in form of polylactic acid (PLA) particulates, in a proppant pack can provide significant increase of permeability after degradation of the PLA particulates over that of non-PLA proppant pack.

To demonstrate the dissolution of degradable thermoplastic particulates with formation fluid (oil), 0.2 grams of polypropylene flakes and 0.2 grams of polystyrene beads were separately placed into two jars containing 10 cc of light crude oil. The mixture was then simply placed into a water bath at 160° F. over time to watch for the dissolution of the degradable thermoplastic particulates into the oil solvent. It was observed that after 72 hours under static exposure to light crude oil, 80-90% of the degradable thermoplastic particulates were dissolved away in light oil. The kinetic of dissolution is expected to be higher at higher temperature and under dynamic condition.

The present disclosure is well adapted to attain the ends and advantages mentioned as well as those that are inherent therein. The particular systems, methods, and/or applications disclosed above are illustrative only, as the present disclosure may be modified and practiced in different but equivalent manners apparent to those skilled in the art having the benefit of the teachings herein. Although individual systems, methods, and compositions are discussed, the disclosure covers all combinations of all those systems, methods, and compositions. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative systems, methods, and compositions disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:
1. A method comprising:
   providing a proppant-free fracturing fluid, wherein the proppant-free fracturing fluid comprises an aqueous base fluid;
   providing a proppant-laden fracturing fluid comprising an aqueous base fluid and proppant particulates coated with a binding agent;
   providing a spacer fluid, wherein the spacer fluid comprises an aqueous base fluid and degradable thermoplastic particulates, wherein the degradable thermoplastic particulates are present in an amount of about 0.1 pounds per gallon to about 10 pound per gallon of the carrier fluid, and wherein the degradable thermoplastic particulates have a multi modal particle size distribution;
   introducing the proppant-free fracturing fluid into a subterranean formation at an injection rate above a fracture gradient to create at least one fracture in the subterranean formation;
   introducing the proppant-laden fracturing fluid and the spacer fluid intermittently into the at least one fracture such that the proppant particulates aggregate in the at least one fracture and are surrounded and neutrally suspended by the spacer fluid, wherein the degradable thermoplastic particulates are degradable to create proppant-free channels in the at least one fracture; and introducing additional degradable thermoplastic particulates to form a diverting plug in at least one flow path to divert subsequently introduced fluids to another flow path, wherein the degradable thermoplastic particulates in the diverting plug are multi-modal in particle size.

2. The method of claim 1, wherein the spacer fluid is a carrier fluid selected from the group consisting of aqueous gels, viscoelastic surfactant gels, foamed gels, emulsions, and combinations thereof.

3. The method of claim 1, wherein the degradable thermoplastic particulates comprise at least one oil-soluble thermoplastic polymer selected from the group consisting of polystyrene, styrene methacrylate copolymer, methyl methacrylate copolymer, polypropylene, polymethyl methacrylate, polyphenylene oxide, polyethylene, ethylene copolymer, propylene copolymer, polypropylene carbonate, ethylene interpolymer, propylene interpolymer, styrene interpolymer, and combinations thereof.

4. The method of claim 1, wherein the degradable thermoplastic particulates have an average diameter from about 0.001 mm to about 10 mm.

5. The method of claim 1, further comprising allowing the degradable thermoplastic particulates to degrade with produced fluids to form proppant free channels in the at least one fracture, and wherein the produced fluids carry the spacer fluid from the at least one fracture.

6. The method of claim 1, wherein the degradable thermoplastic particulates further comprise polystyrene and/or styrene methacrylate copolymer.

7. The method of claim 1, wherein the degradable thermoplastic particulates have an average diameter from about 0.001 mm to about 10 mm.

8. The method of claim 1, further comprising introducing additional degradable thermoplastic particulates to form a diverting plug in at least one flow path to divert subsequently introduced fluids to another flow path, wherein the degradable thermoplastic particulates in the diverting plug are multi-modal in particle size.

9. A method comprising:
providing a proppant-free fracturing fluid, wherein the proppant-free fracturing fluid comprises an aqueous base fluid;
providing a proppant-laden fracturing fluid comprising an aqueous base fluid and proppant particulates coated with a binding agent;
providing a spacer fluid, wherein the spacer fluid comprises an aqueous base fluid and degradable thermoplastic particulates, wherein the degradable thermoplastic particulates comprise at least one of methyl methacrylate copolymer, polypropylene, polymethyl methacrylate, polyphenylene oxide, ethylene copolymer, propylene copolymer, polypropylene carbonate, ethylene interpolymer, propylene interpolymer, styrene interpolymer, and combinations thereof, wherein the proppant has a particle size of about 4 to about 100 mesh, and wherein the degradable thermoplastic particulates have a multi modal particle size distribution;
introducing the proppant-free fracturing fluid into a subterranean formation at an injection rate above a fracture gradient to create at least one fracture in the subterranean formation, wherein the proppant composition is in a carrier fluid in an amount of about 0.1 pounds per gallon to about 10 pound per gallon of the carrier fluid;
introducing the proppant-laden fracturing fluid and the spacer fluid intermittently into the at least one fracture such that the proppant particulates aggregate in the at least one fracture and are surrounded and neutrally suspended by the spacer fluid, wherein the degradable thermoplastic particulates are degradable to create proppant-free channels in the at least one fracture; and
introducing additional degradable thermoplastic particulates to form a diverting plug in at least one flow path to divert subsequently introduced fluids to another flow path, wherein the degradable thermoplastic particulates in the diverting plug are multi-modal in particle size.

10. The method of claim 9, wherein the proppant particulates further comprise at least one binding agent selected from the group consisting of a curable resin, a tackifying agent, or a combination thereof.

11. The method of claim 10, wherein the curable resin comprises at least one resin selected from the group consisting of an epoxy resin, a two component epoxy based resins, novolak resins, polyepoxide resins, phenol-aldehyde resins, urea-aldehyde resins, urethane resins, phenolic resins, furan resins, furan alcohol resins, furfuryl alcohol resins, phenolic/latex resins, phenol formaldehyde resins, polyester resins and hybrids and copolymers thereof, polyurethane resins and hybrids and copolymers thereof, acrylate resins, and combinations thereof.

12. The method of claim 10, wherein a diverting plug is formed in a perforation such that the subsequently introduced fluids forms one or more new primary fractures in the subterranean formation.

13. The method of claim 10, further comprising contacting the degradable thermoplastic particulates with a liquid hydrocarbons produced from the subterranean formation.

14. The method of claim 13, further comprising degrading the degradable thermoplastic particulates with the liquid hydrocarbons, wherein the degradable thermoplastic particulates are degraded to generate voids in a proppant pack.

15. The method of claim 9, wherein the proppant particulates are introduced into the at least one fracture in a carrier fluid selected from the group consisting of aqueous fluids, non-aqueous fluids, slickwater fluids, aqueous gels, viscoelastic surfactant gels, foamed gels, emulsions, and combinations thereof.

16. The method of claim 9, further comprising isolating with a plug an interval of interest before the injecting the proppant-free fracturing fluid.

17. A system comprising:
a proppant-free fracturing fluid, wherein the proppant-free fracturing fluid comprises an aqueous base fluid;
a proppant-laden fracturing fluid, wherein the proppant-laden fracturing fluid comprises an aqueous base fluid and proppant particulates;
a spacer fluid, wherein the spacer fluid comprises an aqueous base fluid and degradable thermoplastic particulates, wherein the degradable thermoplastic particulates have a multi modal particle size distribution, where: about 20-25% by weight of the degradable thermoplastic particulates have a particle size of about 4 to about 10 mesh; about 50% by weight of the degradable thermoplastic particulates have a particle size of about 20 to about 40 mesh; and the remaining degradable thermoplastic particulates have a particle size of less than about 40 mesh; and
pumping equipment capable of pumping the proppant-free fracturing fluid, the proppant-laden fracturing fluid, and/or the degradable thermoplastic particulates down a wellbore at a rate to fracture a subterranean formation.

18. The system of claim 17, wherein the degradable thermoplastic particulates have an average diameter from about 0.001 mm to about 10 mm, wherein the degradable thermoplastic particulates comprise at least one oil-soluble thermoplastic polymer selected from the group consisting of polystyrene, styrene methacrylate copolymer, methyl methacrylate copolymer, polypropylene, polymethyl methacrylate, polyphenylene oxide, polyethylene, ethylene copolymer, propylene copolymer, polypropylene carbonate, ethylene interpolymer, propylene interpolymer, styrene interpolymer, and combinations thereof.

* * * * *